(12) United States Patent
Drewes et al.

(10) Patent No.: US 9,739,324 B2
(45) Date of Patent: Aug. 22, 2017

(54) BRAKE LINING ASSEMBLY

(71) Applicant: SAF-HOLLAND GmbH, Bessenbach (DE)

(72) Inventors: Olaf Drewes, Aschaffenburg (DE); Kai Kühr, Osnabrück (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/767,802

(22) PCT Filed: Mar. 5, 2014

(86) PCT No.: PCT/EP2014/054202
§ 371 (c)(1),
(2) Date: Aug. 13, 2015

(87) PCT Pub. No.: WO2014/135558
PCT Pub. Date: Sep. 12, 2014

(65) Prior Publication Data
US 2015/0377307 A1    Dec. 31, 2015

(30) Foreign Application Priority Data
Mar. 8, 2013  (DE) .................. 10 2013 203 982

(51) Int. Cl.
*F16D 65/08*      (2006.01)
*F16D 65/00*      (2006.01)
(Continued)

(52) U.S. Cl.
CPC ......... *F16D 65/08* (2013.01); *F16D 65/0006* (2013.01); *F16D 65/0012* (2013.01); *F16D 69/0416* (2013.01); *F16D 2069/007* (2013.01)

(58) Field of Classification Search
CPC .. F16D 65/08; F16D 65/0006; F16D 65/0012; F16D 69/0416
See application file for complete search history.

(56) References Cited

U.S. PATENT DOCUMENTS 1,784,994 A * 12/1930 Morris ................ F16D 69/0416
                                                    188/250 G
1,950,260 A     3/1934 Nelson
(Continued)

FOREIGN PATENT DOCUMENTS

DE        3314312        10/1984
DE        9002145         6/1990
(Continued)

OTHER PUBLICATIONS

European Patent Office, International Search Report, Jul. 20, 2014.

*Primary Examiner* — Vishal Sahni
(74) *Attorney, Agent, or Firm* — Price Heneveld LLP

(57) ABSTRACT

The invention relates to a brake lining assembly, particularly for drum brakes, comprising a brake shoe having an outer contour, a brake lining having an inner contour, and an intermediate layer having an outer contact region and an inner contact region. The intermediate layer is arranged between the brake shoe and the brake lining, and the intermediate layer is formed, as viewed radially with respect to an axis of rotation of the brake shoe, in such a manner that the inner contact region is matched in a form-fitting manner to the outer contour of the brake shoe in a circumferential direction of the brake shoe. The outer contact region is matched in a form-fitting manner to the inner contour of the brake lining along the circumferential direction.

18 Claims, 3 Drawing Sheets

(51) Int. Cl.
  *F16D 69/04* (2006.01)
  *F16D 69/00* (2006.01)

(56) References Cited

U.S. PATENT DOCUMENTS

| | | | | | |
|---|---|---|---|---|---|
| 3,862,675 | A | * | 1/1975 | Blatter | B60T 8/56 188/181 R |
| 5,407,036 | A | * | 4/1995 | Hummel | C08L 9/02 188/250 B |
| 5,515,950 | A | * | 5/1996 | Kwolek | F16D 65/092 188/250 B |
| 5,909,171 | A | * | 6/1999 | Kyrtsos | F16D 66/00 116/208 |
| 2001/0030094 | A1 | * | 10/2001 | Pareti | F16D 65/0006 188/250 R |
| 2005/0077127 | A1 | * | 4/2005 | Beri | F16D 65/08 188/250 R |
| 2005/0212357 | A1 | * | 9/2005 | Adams | B60T 17/18 303/122.03 |
| 2010/0253497 | A1 | * | 10/2010 | Bakker | F16D 66/027 340/454 |
| 2013/0134001 | A1 | * | 5/2013 | Liu | F16D 65/08 188/325 |

FOREIGN PATENT DOCUMENTS

| | | |
|---|---|---|
| DE | 20011435 | 1/2001 |
| DE | 19953405 | 5/2001 |
| DE | 19882844 | 10/2002 |
| DE | 10135624 | 2/2003 |
| DE | 102008032818 | 4/2009 |
| DE | 102009014564 | 9/2010 |
| EP | 0686785 | 12/1995 |
| EP | 0921330 | 6/1999 |
| EP | 2149721 | 2/2010 |
| GB | 2042109 | * 9/1980 |

* cited by examiner

BRAKE LINING ASSEMBLY

BACKGROUND OF THE INVENTION

The present invention relates to a brake lining assembly, particularly for drum brakes, as well as an intermediate layer, particularly for being arranged between a brake lining and a brake shoe of a drum brake.

In the field of commercial vehicles, drum brake linings are as a rule riveted directly onto the brake shoes, producing a direct contact between the drum brake linings (friction material) and the brake shoe(s). In order to ensure that as much of the linings as is possible has contact, very strict tolerances have to be observed (e.g. by mechanical working or by calibration), which requires great manufacturing outlay (time and costs) and which often is not possible in a process-secure manner.

Therefore, the object underlying the present invention is to provide a brake lining assembly, particularly for drum brakes, as well as an intermediate layer, particularly for being arranged between a brake lining and a brake shoe of a drum brake, with the help of which the manufacture-related geometric tolerances for brake linings and brake shoes can be enlarged.

SUMMARY OF THE INVENTION

According to the invention, a brake lining assembly, particularly for drum brakes, comprises a brake shoe having an outer contour, a brake lining having an inner contour, and an intermediate layer having an outer contact region and an inner contact region, wherein the intermediate layer is arranged between the brake shoe and the brake lining, and wherein the intermediate layer is formed, as viewed radially with respect to the brake shoe, in such a manner that the inner contact region at least in a certain area is matched in a form-fitting manner to the outer contour of the brake shoe in a circumferential direction of the brake shoe, wherein, at least in a certain area, the outer contact region is matched in a form-fitting manner to the inner contour of the brake lining along the circumferential direction. Drum brakes are radial brakes, wherein the brake linings act onto a cylindrical surface, i.e. the drum brake drum or also the brake drum. In order to achieve a braking effect, the brake linings are pushed by the brake shoes from the inside against the revolving brake drum. The brake drum is preferably a cylindrical, rotation-symmetric component having an axis of rotation. Within the brake drum, there are as a rule arranged two brake shoes, wherein on each of the brake shoes at least one brake lining is fixed or arranged. To this end, the brake lining preferably has the inner contour. In manufacture, it is often difficult or requires much effort to form the inner contour of the brake lining and the outer contour of the brake shoe so precisely that it becomes possible for the brake lining to be arranged on the brake lining over the entire surface thereof. There may be present surface irregularities in the contours (inner contour of the brake lining and outer contour of the brake shoe), for example, or the difference in the radii of the outer contour of the brake shoe and the inner contour of the brake lining may be such that it is prevented that the surface of the brake lining rests on that of the brake shoe. Therefore, advantageously, the intermediate layer may be arranged between the brake lining and the brake shoe, whereby an indirect arrangement of the brake lining on the brake shoe becomes possible. Advantageously, when seen radially with respect to the axis of rotation, a thickness of the intermediate layer is such that the inner contact region of the intermediate layer is matched to the outer contour of the brake shoe in a form-fitting manner, while simultaneously the outer contact region is matched to the inner contour of the brake lining in a form-fitting manner. To put it differently, thus, the intermediate layer allows for an indirect form-fitting arrangement of the brake lining on the brake shoe. Advantageously, the brake lining is mounted in such a manner that it is not braced due to the arrangement via the intermediate layer. As a rule, brake linings are very rigid or stiff. When such a rigid brake lining, which has a larger or a smaller inner diameter (what is meant is the diameter of the inner contour) relative to the outer contour of the brake shoe, is fixed on the brake shoe, the brake lining would be either compressed or expanded when it is fixed. Thus, additional stresses would be applied onto the brake lining, which stresses can now be avoided by using the intermediate layer. Advantageously, also a friction surface of the brake lining can be positioned essentially parallel to the brake shoe by means of the intermediate layer. To put it differently, by means of the intermediate layer, the brake lining can be positioned on the brake shoe such that the friction surface of the brake lining and the friction surface of the brake drum are arranged in a form-fitting manner over the entire friction surface during a brake operation. To put it differently, due to the intermediate layer, the friction surface of the brake lining can be positioned or is positioned essentially parallel to the outer contour of the brake shoe and/or the friction surface of the brake drum. Advantageously, by means of the intermediate layer, the entire friction surface of the brake lining may used in order to achieve a maximum braking effect. Thus, on the other hand, the intermediate layer allows for a balancing function between the brake lining and the brake shoe in that it allows that the brake lining is arranged on the brake shoe over a as much of the surface thereof as is possible (indirectly by means of the intermediate layer). Additionally, the intermediate layer makes it possible that the brake lining is positioned relative to the brake shoe such that the brake lining (during the brake operation) is pushed by the brake shoe against the brake drum as planarly as is possible and over the greatest possible surface. A thickness of the intermediate layer, which is dimensioned or measured essentially transverse to the axis of rotation, is preferably in a range of about 0.02 to 3 mm, particularly preferably in a range of about 0.05 to 2 mm. A relationship of the thickness of the intermediate layer to a thickness of the brake lining, when viewed radially with respect to the axis of rotation, is preferably in a range of about 0.005 to 0.2, particularly preferably in a range of about 0.01 to 0.1. As a matter of course, when viewed in the circumferential direction, the thickness of the intermediate layer need not be constant. In order to provide the described balancing functions, in reality it will be the case that the thickness of the intermediate layer changes at least in a certain area in the circumferential direction. By arranging the intermediate layer, it becomes possible to allow for greater manufacturing tolerances both for brake shoes and for brake linings so that expensive and time-intensive manufacturing steps can be omitted (e.g. calibration, turning to proper dimensions, grinding). Advantageously, the intermediate layer additionally prevents an underrusting or rust creep of the brake linings so that it is also not necessary to paint the brake shoes. Advantageously, the intermediate layer is also formed such that a thermal decoupling of brake lining and brake shoe is possible. Advantageously, to this end, for the intermediate layer a material is chosen, which has a lower thermal conductivity than the material of the brake shoe (e.g. a steel or cast material). Advantageously, the intermediate layer may also support a form fit between the brake lining and the brake shoe by an additional sticking friction. It should be noted that it is not the main function of the intermediate layer to fix the brake lining to the brake show since a form fit and/or a force fit can still be realized by additional fasteners, e.g. rivets and/or screws/bolts. In case the lining is exchanged, the intermediate layer may be removed chemically, thermally and/or mechanically. The intermediate layer may also be formed as a component of the lining or of the brake shoe. In a preferred embodiment, the intermediate layer is made from a plastic material.

Expediently, the intermediate layer has at least one arrangement region, which is adapted for arranging an additional element. Preferably, the arrangement region is formed as a gap or cavity in the intermediate layer. Advantageously, there is provided a hollow space, for example, in which the additional element (or also several additional elements) may be arranged. As a matter of course, the intermediate layer may also have more than one arrangement region. Preferably, the arrangement region is arranged in that area of the intermediate layer, in which the thickness of the intermediate layer is sufficiently big. The arrangement region may be dimensioned such that the additional element will not completely fill the volume of the arrangement region. The arrangement region may also be dimensioned or formed such that it precisely copies an outer contour of the additional element. Advantageously, during the manufacture of the intermediate layer, for example, the additional element may be embedded therein. When the intermediate layer is cast, for example, the additional element may be put into a respective casting mold and be cast-in.

Expediently, the arrangement region comprises at least one connection portion, which provides a spatial connection with the brake lining and/or the brake shoe (or also other vehicle components). The connection portion or several connection portions may also interconnect several arrangement regions. Preferably, the connection portion is formed as a channel or the like, which provides a connection with the brake lining arranged on the intermediate layer and/or the brake shoe arranged on the intermediate layer. On the one hand, the connection portion may serve to provide access to the arrangement region in order to arrange the additional element therein, for example, or also to bring another element, such as a cable, close to the additional element.

Expediently, the additional element is adapted for an exchange of information and/or data in, on and/or from the brake lining assembly. Advantageously, the additional element is a sensor and/or an RFID chip (radio-frequency identification) and/or a measuring element. Advantageously, one or several additional elements and/or also sensors or measuring tapes may be integrated into the intermediate layer, which may be used for identifying the linings, or by means of which various information on the operational state of the brake in general and/or the linings may be captured and transmitted (e.g. wear limits, pressures, shear forces, temperatures, etc.).

Advantageously, the additional element is connected to the brake lining and/or the brake shoe by means of at least one connection element, particularly a cable. By means of the cable, which advantageously may be arranged in the connection portion, it is possible to exchange data, such as data relating to the wear condition or the temperature of the brake lining, between the brake lining and the additional element. Advantageously, said data may be further processed by means of a further connection element, leading from the intermediate layer via the brake shoe on to the vehicle electronics.

Advantageously, the additional element comprises receiving and/or sending means, which are provided for a cable-less exchange of information and/or data. In this case, a connection element, such as in the form of a cable, would no longer be necessary. Advantageously, the cable-less exchange of information and/or data is not only done by means of the vehicle electronics, but may also be used with the help of a respective reading device during a visit to the garage, for example, in order to determine the wear condition of the brake linings as quickly as is possible, for example.

Expediently, in the at least one arrangement region a sacrificial anode is arranged, which by means of the connection portion provides a corrosion protection effect. Preferably, by means of the connection portion, an electrically conductive connection is provided between the sacrificial anode and the material to be protected from corrosion, e.g. the brake shoe. Advantageously, the additional element is made from a baser material than the brake shoe, for example. Thus, the additional element may serve as a sacrificial anode. In preferred embodiments, manganese or zinc, for example, is used as a material for the additional element. However, any material may be used for the additional element, as long as it may be considered to be a baser material in relation to the material(s) of the brake shoe or the components to be protected from corrosion. Here, the terms "noble" and "base" are defined such that a material is all the nobler the more positive its standard potential is. The baser material has a great ability of oxidation or loss of electrons in an aqueous environment, wherein said ability can be taken from the known electrochemical series. Understandably, a material is highly suitable as a sacrificial anode, which material, as a redox pair with the material of the brake shoe or the material of the component to be protected from corrosion, has a particularly high difference of the standard potentials. Preferably, the standard potential between the additional element and/or the brake shoe or the component to be protected from corrosion is about 0.1 to 1.1 V, particularly preferably about 1.1 to 3.3 V. Depending on the material pairing also higher values are indeed desired.

Preferably, by means of the specific weight of the intermediate layer, a mechanical and/or acoustic damping effect is provided. Advantageously, to this end, the intermediate layer is made from a material, which has a higher specific weight than the brake lining. Preferably, thus, the natural frequency of the brake lining or of the brake lining assembly may be indirectly reduced such that a damping effect is provided. Expediently, at least in a certain area, the intermediate layer is made from a material having a progressive spring characteristic. Advantageously, in order to achieve the progressive spring characteristic, various materials, preferably two different materials, are used for manufacturing the intermediate layer, wherein one material is more rigid than the other one.

Advantageously, the intermediate layer is made from at least a first and a second material. The first material is preferably made softer than the second material and arranged in that area of the intermediate layer, which is in contact with the brake lining and the brake shoe, i.e. advantageously in the area of the inner and outer contours. To put it differently, so to say an outer area or an outer layer of the intermediate layer is formed from the first material, while so to say a "core of the intermediate layer" is made from the second material. Here, the first material is preferably softer than the materials of the brake shoe and/or of the brake lining such that local irregularities or roughnesses of the outer contour of the brake shoe or of the inner contour of the brake lining may be balanced by the intermediate layer or the first material thereof. At the same time, by means of the second material of the intermediate layer, which is adapted for absorbing and transmitting the highest compressive forces, it is possible to transmit the highest compressive forces, which are required for achieving a high brake force. Expediently, it is also possible to readjust the brake lining by means of the intermediate layer, e.g. by using at least one highly elastic material. Alternatively preferably, at least one material is formed such that it has two states. Preferably, the material is formed soft and resilient in a first state, in order to provide the above-described balancing functions. In a second state, the material is then preferably formed hard or hardened such that the position of the brake lining in relation to the brake shoe essentially can no longer be changed.

Advantageously, a separating element 94 (FIG. 2a), particularly a thread, is introduced into the intermediate layer, by means of which the intermediate layer may be dismounted. When the brake lining is replaced, the thread may be used to cut through the intermediate layer after possible rivet joints etc. have been removed, such that the brake lining may be replaced rapidly. In addition, when an exchange of the lining is imminent, it is possible to remove the intermediate layer chemically, thermally and/or mechanically. This relates not only to the removal of the brake shoe but also to the removal of the brake lining. This is very advantageous particularly from the point of view of recycling.

Advantageously, the stiffness of the intermediate layer varies along the circumferential direction, such that the application or contact of the brake lining on a brake drum may be influenced. During the brake operation the brake drum, which rotates in the circumferential direction, exerts a torque onto the brake lining, which is in contact during the brake operation. Depending on a support or mounting of the brake shoe, said torque may reinforce the braking effect during the brake operation, i.e. when the torque acts in the direction of the support or mounting of the brake shoe (cf. brake shoe of a drum brake, which runs aground, i.e. makes contact). The load on the first area of the brake lining, when seen in the circumferential direction, is particularly high. Advantageously, by means of an intermediate layer, which is made more rigid in this area, for example, than in a second area, which is behind the first area, when seen in the circumferential direction, the application of the brake lining against the brake drum may be positively influenced in that a very even application against and/or a very even wear on the brake lining and/or the brake drum is achieved. Preferably, the difference in stiffness is achieved by using materials having different stiffnesses.

According to the invention, there is provided an intermediate layer, particularly for being arranged between a brake lining and a brake shoe of a drum brake, comprising an outer contact region and an inner contact region, wherein the outer contact region can be connected in a form-fitting manner to a brake lining at least in a certain area, and wherein the inner contact region at least in a certain area may be connected in a form-fitting manner to a brake shoe, wherein the intermediate layer has at least one arrangement region, which is adapted for arranging an additional element. The mentioned advantages and features of the brake lining assembly, particularly for drum brakes, according to the invention apply equally to the intermediate layer according to the invention.

Further advantages and features become apparent from the following description of preferred embodiments of the brake lining assembly according to the invention as well as the intermediate layer according to the invention with reference to the appended Figures. Individual features of the various embodiments may be combined with each other within the scope of the invention.

DETAILED DESCRIPTION OF THE PREFERRED EMBODIMENTS

Figure 1:
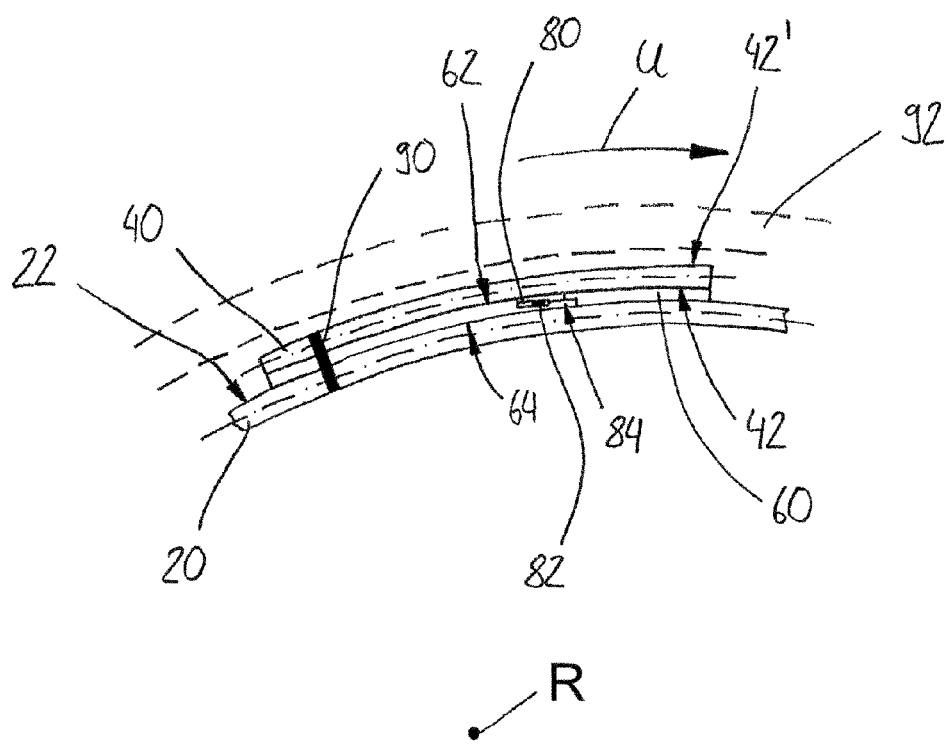
FIG. 1 shows a basic principle of a preferred embodiment of a brake lining assembly.

FIG. 1 shows a basic principle of a preferred embodiment of a brake lining assembly, particularly for drum brakes. A brake lining 40 is arranged on a brake shoe 20 by means of an intermediate layer 60. There is shown a circumferential direction U, along which a brake drum 92, which is indicated in dashed lines, moves or rotates. The brake lining assembly has a common axis of rotation R. The intermediate layer 60 is connected to an inner contour 42 of the brake lining 40 by means of an outer contact region, and it is connected to an outer contour 22 of the brake shoe 20 by means of an inner contact region 64. By way of example a fastener 90 is shown, which serves for connecting the brake lining 40 and the brake shoe 20 in a form-fitting and/or force-fitting manner. As a matter of course, there are provided preferably several fasteners 90. In the intermediate layer 60 an arrangement region 80 is indicated, in which an additional element 82 is arranged. The arrangement region 80 is connected to or in contact with both the brake shoe 20 and the brake lining 40 by means of connection portions 84.

Figure 2A:
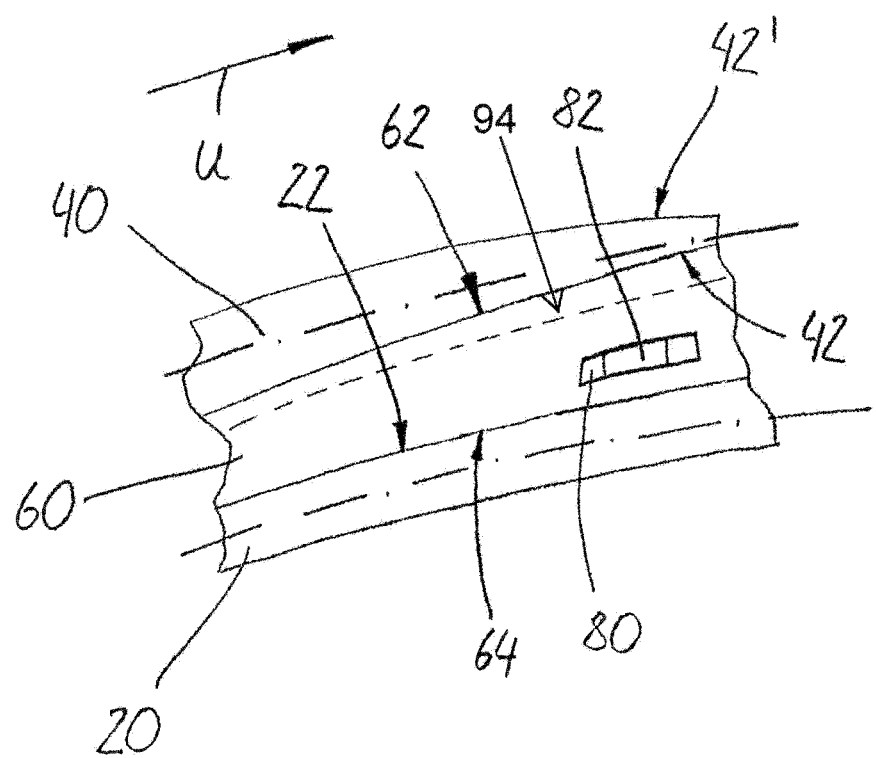
FIG. 2a shows a sketchy representation of a preferred embodiment of an intermediate layer arranged between a brake lining and a brake shoe.

FIG. 2a shows a schematic representation of a preferred embodiment of an intermediate layer 60, arranged between a brake lining 40 and a brake shoe 20. The intermediate layer 60 is arranged on an inner contour 42 of the brake lining 40 by means of an outer contact region 62. The intermediate layer 60 is connected to an outer contour 22 of a brake shoe 20 by means of an inner contact region 64. It is clearly visible that the inner contour 42 of the brake lining 40 and a friction surface 42' of the brake lining are not formed concentrically. The arrangement of the intermediate layer 60 between the brake shoe 20 and the brake lining 40 makes it however possible that the friction surface 42' of the brake lining and the outer contour 22 of the brake shoe are positioned parallel relative to each other. The functioning of the intermediate layer 60 would be similar if e.g. the curvature of the inner contour 42 would be larger or smaller than the curvature of the outer contour 22 of the brake shoe 20. Said difference could be balanced by the intermediate layer 60 such that the friction surface 42' of the brake lining 40 is directed essentially parallel to the brake shoe 20 or to the outer contour thereof.

Figure 2B:
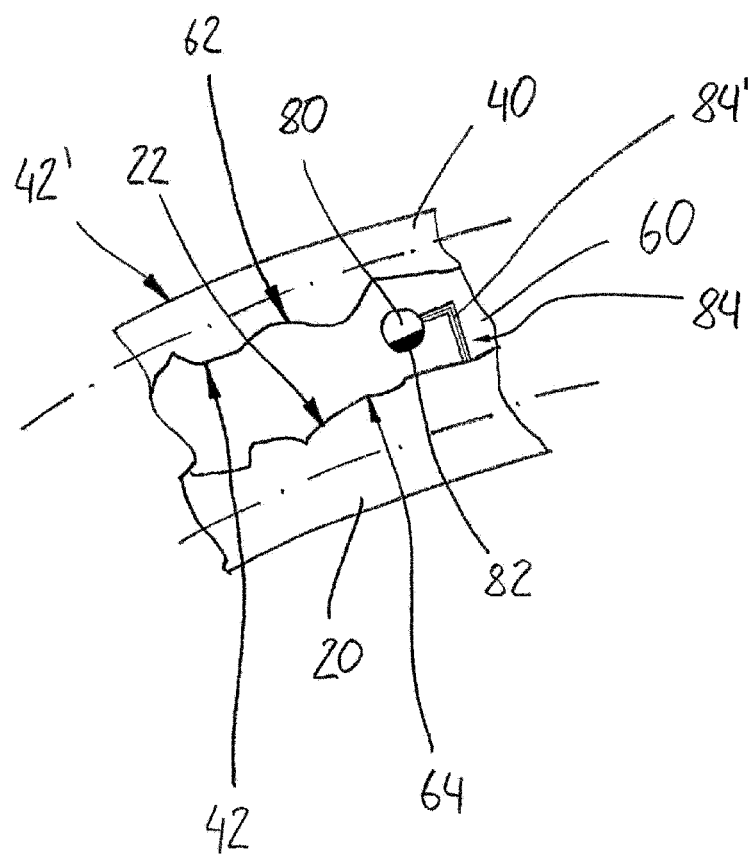
FIG. 2b shows a further sketchy representation of a further preferred embodiment of an intermediate layer, arranged between a brake lining and a brake shoe.
Figure 2B:

FIG. 2b shows a further schematic representation of a preferred embodiment of an intermediate layer 60, arranged between a brake lining 40 and a brake shoe 20. An inner contour 42 of the brake lining 40 as well as an outer contour 22 of the brake shoe 20 are shown rough or jagged. Said roughnesses or jaggednesses may advantageously be balanced by the intermediate layer 60. An arrangement area 80 is formed essentially as a round ball, in which an additional element 82 is arranged. The arrangement region 80 is connected to the brake shoe 20 by means of a connection portion 84, in which a connection element 84' is arranged.

LIST OF REFERENCE SIGNS 20 brake shoe
22 outer contour
40 brake lining
42 inner contour
42' friction surface
60 intermediate layer
62 outer contact region
64 inner contact region
80 arrangement region
82 additional element
84 connection portion
84' connection element
90 fastener
92 brake drum
R axis of rotation
U circumferential direction

The invention claimed is:

1. A brake lining assembly, comprising:
a brake shoe having an outer contour;
a brake lining having an inner contour; and
an intermediate layer having an outer contact region and an inner contact region;
wherein the intermediate layer is arranged between the brake shoe and the brake lining;
wherein the intermediate layer is configured, as viewed radially with respect to the brake shoe, in such a manner that at least a certain area of the inner contact region is matched in a form-fitting manner to the outer contour of the brake shoe in a circumferential direction of the brake shoe; and
at least a certain area of the outer contact region is matched in a form-fitting manner to the inner contour of the brake lining along the circumferential direction; and
wherein the intermediate layer has at least one arrangement region configured for arranging an additional element where the additional element is configured for at least one of an exchange of information and/or data in, on and/or from the brake lining assembly, and the intermediate layer includes a separating element configured to allow dismounting of the intermediate layer, wherein the separating element comprises a thread that cuts through the intermediate layer.

2. The brake lining assembly of claim 1, wherein the arrangement region comprises at least one connection portion providing a spatial connection with at least one of the brake lining and the brake shoe.

3. The brake lining assembly of claim 2, wherein the additional element is connected to at least one of the brake lining and the brake shoe by at least one connection element.

4. The brake lining assembly of claim 3, wherein the at least one connection element comprises a cable.

5. The brake lining assembly of claim 3, wherein in the at least one arrangement region a sacrificial anode is arranged which provides a corrosion protection effect via the connection portion.

6. The brake lining assembly of claim 5, wherein at least one of a mechanical and acoustic dampening effect is provided by the specific weight of the intermediate layer.

7. The brake lining assembly of claim 6, wherein the intermediate layer comprises at least a first and a second material.

8. The brake lining assembly of claim 7, wherein the intermediate layer along the circumferential direction has a varying stiffness such that the application of the brake lining against a brake drum is influenced.

9. The brake lining assembly of claim 8, wherein the intermediate layer, as viewed radially with respect to an axis of rotation, has a thickness which is adapted such that the friction surface of the brake lining is configured to be positioned substantially parallel to at least one of the outer contour of the brake shoe and a friction surface of a brake drum.

10. The brake lining assembly of claim 1, wherein the additional element is connected to at least one of the brake lining and the brake shoe by at least one connection element.

11. The brake lining assembly of claim 10, wherein the at least one connection element comprises a cable.

12. The brake lining assembly of claim 10, wherein in the at least one arrangement region a sacrificial anode is arranged which provides a corrosion protection effect via the connection portion.

13. The brake lining assembly of claim 1, wherein at least one of a mechanical and acoustic dampening effect is provided by the specific weight of the intermediate layer.

14. The brake lining assembly of claim 1, wherein the intermediate layer comprises at least a first and a second material.

15. The brake lining assembly of claim 1, wherein the intermediate layer along the circumferential direction has a varying stiffness such that the application of the brake lining against a brake drum is influenced.

16. The brake lining assembly of claim 1, wherein the intermediate layer, as viewed radially with respect to an axis of rotation, has a thickness which is adapted such that the friction surface of the brake lining is configured to be positioned substantially parallel to at least one of the outer contour of the brake shoe and a friction surface of a brake drum.

17. An intermediate layer configured for being arranged between a brake lining and a brake shoe of a drum brake, comprising:
an outer contact region; and
an inner contact region;
wherein at least a certain area of the outer contact region is configured to be connected to a brake lining in a form-fitting manner;
wherein at least a certain area of the inner contact region is configured to be connected to a brake shoe in a form-fitting manner;
wherein the intermediate layer has at least one arrangement region which is adapted for arranging an additional element;
and wherein the intermediate layer includes a separating element configured to allow dismounting of the intermediate layer, and wherein the separating element comprises a thread that cuts through the intermediate layer.

18. A brake lining assembly, comprising:
a brake shoe having an outer contour;
a brake lining having an inner contour; and
an intermediate layer having an outer contact region and an inner contact region;

wherein the intermediate layer is arranged between the brake shoe and the brake lining;

wherein the intermediate layer is configured, as viewed radially with respect to the brake shoe, in such a manner that at least a certain area of the inner contact region is matched in a form-fitting manner to the outer contour of the brake shoe in a circumferential direction of the brake shoe; and at least a certain area of the outer contact region is matched in a form-fitting manner to the inner contour of the brake lining along the circumferential direction, wherein at least one of the inner contact region and the outer contact region is substantially arcuately shaped as viewed radially with respect to the brake shoe; and wherein the intermediate layer has at least one arrangement region configured for arranging an additional element where the additional element is configured for at least one of an exchange of information and/or data in, on and/or from the brake lining assembly, and the intermediate layer includes a separating element configured to allow dismounting of the intermediate layer, and wherein the separating element comprises a thread that cuts through the intermediate layer.

* * * * *